(12) United States Patent
Nakamatsu et al.

(10) Patent No.: US 9,705,903 B2
(45) Date of Patent: Jul. 11, 2017

(54) CALL CONTROL DEVICE, CALL CONTROL METHOD, AND CALL CONTROL SYSTEM

(71) Applicant: FUJITSU LIMITED, Kawasaki-shi, Kanagawa (JP)

(72) Inventors: Ryouji Nakamatsu, Fukuoka (JP); Hiromitsu Kajiyama, Fukuoka (JP); Shigehiko Hirata, Asakura (JP); Hideo Okawa, Fukuoka (JP); Akio Koga, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/050,647

(22) Filed: Feb. 23, 2016

(65) Prior Publication Data

US 2016/0248789 A1    Aug. 25, 2016

(30) Foreign Application Priority Data

Feb. 25, 2015   (JP) ................. 2015-035478

(51) Int. Cl.
*H04W 12/06*    (2009.01)
*H04L 29/06*    (2006.01)

(52) U.S. Cl.
CPC ...... *H04L 63/1416* (2013.01); *H04L 65/1006* (2013.01)

(58) Field of Classification Search
None
See application file for complete search history.

(56) References Cited

U.S. PATENT DOCUMENTS

2009/0132813 A1* 5/2009 Schibuk ............... G06Q 20/223
                                                          713/158
2013/0061055 A1* 3/2013 Schibuk ............... G06Q 20/223
                                                          713/172
2016/0099963 A1* 4/2016 Mahaffey ............ H04L 63/1433
                                                          726/25

FOREIGN PATENT DOCUMENTS

JP    2005-258498    9/2005
JP    2007-188437    7/2007
JP    2007-267064    10/2007

* cited by examiner

*Primary Examiner* — Diane Mizrahi
(74) *Attorney, Agent, or Firm* — Fujitsu Patent Center

(57) ABSTRACT

A call control device including: a memory, and a processor coupled to the memory and configured to: receive a call request from a communication device, a source of the call request being a terminal, the call request being transferred by the communication device when the terminal is registered in a management device, and request the management device to deregister the terminal when the call control device is determined that the call control device is attacked from the terminal based on the call request.

8 Claims, 16 Drawing Sheets

FIG. 7

| PHONE NUMBER | TIME | NUMBER OF TIMES OF RECEPTION |
|---|---|---|
| 090AAAABBBB | H1:M1:S1 | 1 |
| 090CCCCDDDD | H2:M2:S2 | T |

FIG. 8

| PHONE NUMBER | REGISTRATION STATE | ADDRESS | FORCED DEREGISTRATION FLAG |
|---|---|---|---|
| 090AAAABBBB | REGISTERED | xxx.xxx.xxx.xxx | – |
| 090CCCCDDDD | REGISTERED | yyy.yyy.yyy.yyy | – |
| 090EEEEFFFF | NOT REGISTERED | – | ON |
| 090GGGGHHHH | NOT REGISTERED | – | OFF |

US 9,705,903 B2

CALL CONTROL DEVICE, CALL CONTROL METHOD, AND CALL CONTROL SYSTEM

CROSS-REFERENCE TO RELATED APPLICATION

This application is based upon and claims the benefit of priority of the prior Japanese Patent Application No. 2015-035478, filed on Feb. 25, 2015, the entire contents of which are incorporated herein by reference.

FIELD

The embodiment discussed herein is related to a call control device, a call control method, and a call control system.

BACKGROUND

FIG. 1 illustrates an example of a network system in which the Session Initiation Protocol (SIP) is used. A network system 100 includes a carrier switching network 110, a terminal 3, and a subscriber data management server 4. By using the SIP, audio communication may be executed in a network other than networks for audio communication. The SIP is a protocol in which messages that include readable plaintexts are used and details of the messages may be easily altered. Thus, an SIP signal may be used to make an attack against the vulnerability of the carrier switching network 110.

For example, in a 3rd generation (3G) network, the SIP signal passes through a radio network controller (RNC) and an asynchronous transfer mode (ATM) switching unit before arriving at the carrier switching network 110 from a 3G terminal in the example illustrated in FIG. 1. The SIP signal transmitted by the 3G terminal is temporarily terminated by the ATM switching unit and is not directly provided to the carrier switching network. Thus, in the 3G network, the carrier switching network 110 is protected from vulnerability attacks using SIP signals.

In a Long Term Evolution (LTE) network, an SIP signal reaches the carrier switching network from an LTE terminal 3 without being converted by any switching unit or the like. Thus, it is considered that, in the LTE network, an LTE terminal may be operated to easily make an attack against the SIP vulnerability of the carrier switching network 110.

FIG. 2 is a diagram illustrating an example of a system configuration of the carrier switching network 110. The carrier switching network 110 includes a plurality of SIP proxy call control server 1 and a plurality of subscriber management call control servers 2. The SIP proxy call control servers 1 are SIP proxy servers. The subscriber management call control servers 2 are servers that each connect a radio network to an IP network. The subscriber data management server 4 is an SIP location server. In the SIP, if subscriber information of the LTE terminal 3 is not registered in the subscriber data management server 4 that is the SIP location server, the LTE terminal 3 is not permitted to transmit a call request. The subscriber information is information identifying the LTE terminal and includes, for example, a phone number and an IP address. The subscriber data management server 4 is an example of a "management device".

When receiving an SIP_INVITE message that is a call request signal, a subscriber management call control server 2 confirms whether or not subscriber information of a source terminal that transmitted the message is registered in the subscriber data management server 4. If the subscriber information of the source terminal is not registered in the subscriber data management server 4, the subscriber management call control server 2 transmits, to the source terminal, an SIP_4XX_RESPONSE message indicating a call disconnection. 4XX indicates that a status code of the RESPONSE message is in the 400s. If the status code is in the 400s, the status code indicates a client error or indicates that the source terminal has an abnormality.

If the subscriber information of the source terminal is registered in the subscriber data management server 4, the subscriber management call control server 2 selects, from among the plurality of SIP proxy call control servers 1, a transfer destination of the SIP_INVITE message and transfers the SIP_INVITE message to the selected SIP proxy call control server.

FIG. 3 is a diagram illustrating an example of a sequence of a process to be executed in the carrier switching network 110 when an SIP vulnerability attack signal is received. Hereinafter, each of LTE terminals is also referred to as user equipment (UE). FIG. 3 assumes that subscriber information of UE 3 is registered in the subscriber data management server 4. In FIG. 3, an SIP proxy call control server is indicated by reference symbol P1. In FIG. 3, a server that is among the plurality of subscriber management call control servers 2 and is related to the process to be executed on an SIP vulnerability attack signal, and a server that is among SIP proxy call control servers P1 and is related to the process to be executed on the SIP vulnerability attack signal, are illustrated.

In S1, the UE 3 transmits an SIP_INVITE message that is the SIP vulnerability attack signal. Since subscriber data of the UE 3 is registered in the subscriber data management server 4, the SIP_INVITE message is transmitted through the subscriber management call control server 2 to the SIP proxy call control server P1.

In S2, the SIP proxy call control server P1 receives the SIP_INVITE message and checks the vulnerability of the SIP. The SIP_INVITE message that is the SIP vulnerability attack signal may include undefined invalid information in a field of a header or may store a meaningless character string in a data field. The SIP proxy call control server P1 checks the vulnerability by checking whether or not the SIP message is in an invalid format not conforming to a standard format and is a message transmitted to make an attack against the vulnerability and reported to Information-technology Promotion Agency, Japan (IPA).

Since the SIP_INVITE message received by the SIP proxy call control server P1 is the SIP vulnerability attack signal, the SIP proxy call control server P1 determines that the SIP_INVITE message is invalid and detects an SIP vulnerability attack in S2.

In S3, the SIP proxy call control server P1 generates an SIP_4XX_RESPONSE message and transmits the generated SIP_4XX_RESPONSE message to the source UE 3. When receiving the SIP_4XX_RESPONSE message, the source UE 3 disconnects a corresponding call.

Since the UE 3 receives the SIP_4XX_RESPONSE message, the UE 3 disconnects the call in S4.

Examples of related art are Japanese Laid-open Patent Publications Nos. 2007-267064, 2005-258498, and 2007-188437.

SUMMARY

According to an aspect of the invention, a call control device including: a memory, and a processor coupled to the memory and configured to: receive a call request from a communication device, a source of the call request being a terminal, the call request being transferred by the communication device when the terminal is registered in a management device, and request the management device to deregister the terminal when the call control device is determined that the call control device is attacked from the terminal based on the call request.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates an example of a subscriber information table;

FIG. 8 illustrates an example of a subscriber data table;

DESCRIPTION OF EMBODIMENT

In the conventional process executed when the SIP vulnerability attack signal is received, congestion may occur and a service of the carrier switching network 110 may be stopped.

Figure 4:
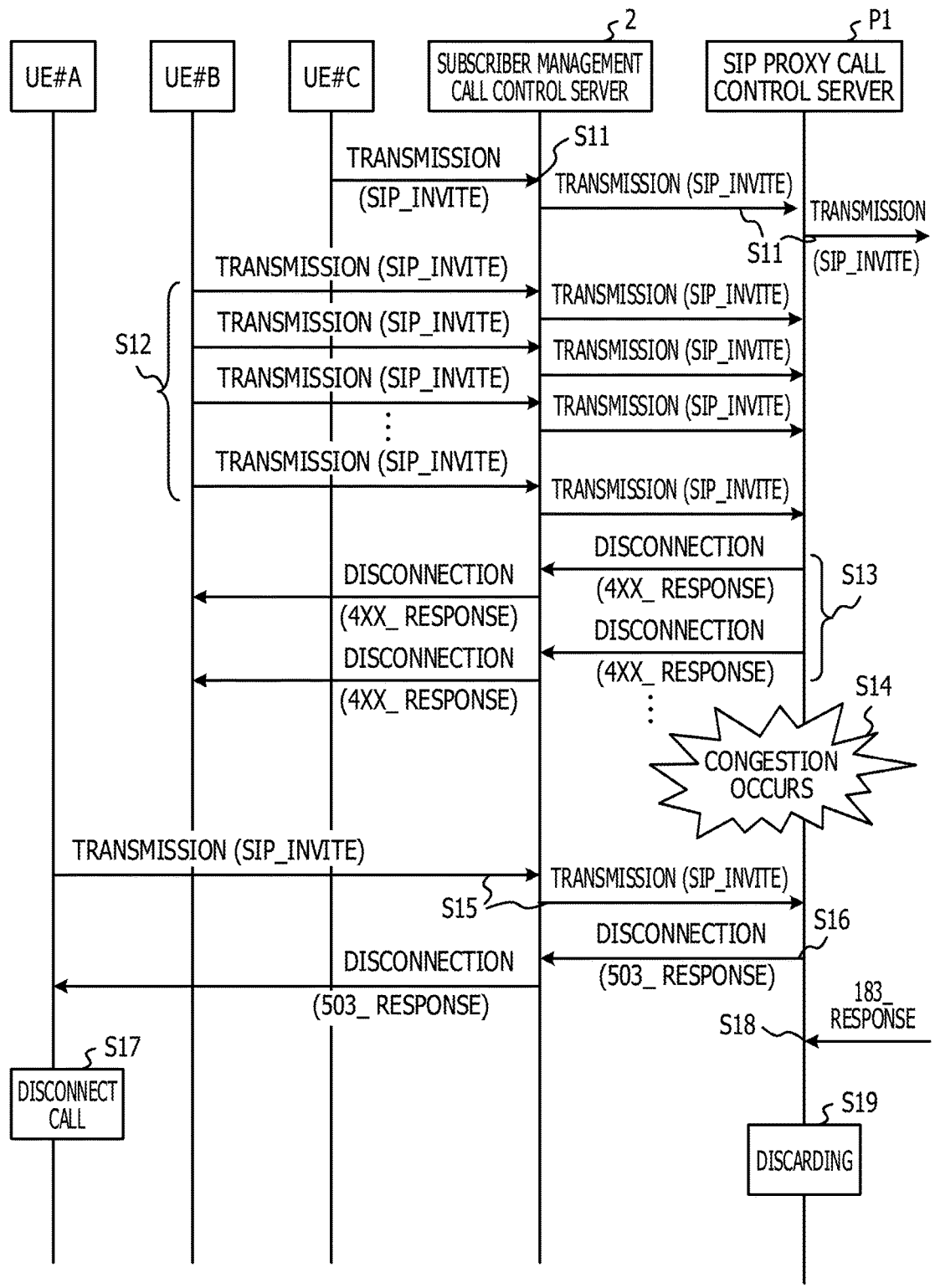
FIG. 4 is a sequence diagram illustrating an example in which congestion occurs due to an SIP vulnerability attack.

FIG. 4 is a sequence diagram illustrating an example in which congestion occurs due to an SIP vulnerability attack. In FIG. 4, UE #A and UE #C are valid subscriber terminals, and UE #B is an invalid terminal of a vulnerability attacker. It is assumed that subscriber information of the UE #A, the UE #B, and the UE #C is registered in the subscriber data management server 4. In addition, it is assumed that the UE #A, the UE #B, and the UE #C are located close to each other and that SIP_INVITE messages transmitted by the UE #A, the UE #B, and the UE #C are processed by the same subscriber management call control server 2 and the same SIP proxy call control server P1.

In S11, the UE #C transmits an SIP_INVITE message. Since the UE #C is the valid subscriber terminal, the SIP_INVITE message is transmitted through the subscriber management call control server 2 and the SIP proxy call control server P1 to receiving UE 3.

In S12, the UE #B that is the invalid terminal continuously transmits a large amount of SIP_INVITE messages that are SIP vulnerability attack signals. The SIP_INVITE messages transmitted by the UE #B include different CALL-IDs and are identified as different calls by the SIP proxy call control server P1. The CALL-IDs may be arbitrarily set by the source of the CALL-IDs.

In S13, the SIP proxy call control server P1 checks vulnerability of the SIP_INVITE messages continuously received from the UE #B. Since the SIP_INVITE messages transmitted by the UE #B are the SIP vulnerability attack signals, the SIP proxy call control server P1 transmits SIP_4XX_RESPONSE messages for the SIP_INVITE messages.

In S14, congestion occurs in the SIP proxy call control server P1 due to the SIP_INVITE messages sequentially transmitted by the UE #B and the SIP_4XX_RESPONSE messages transmitted by the SIP proxy call control server P1.

In S15, in a state in which the congestion occurs in the carrier switching network 110, an SIP_INVITE message is transmitted by the UE #A or the valid subscriber terminal and reaches the SIP proxy call control server P1.

In S16, the SIP proxy call control server P1 is in a congested state and does not execute a process on the SIP_INVITE message transmitted by the UE #A and transmits an SIP_503_RESPONSE message to the UE #A. The RESPONSE message that has a status code in the 500s is a server error message or a message indicating that the SIP proxy control server P1 has an abnormality. The status code 503 indicates that a service is not able to be used. As an example, the status code 503 is used when congestion occurs in the network. When receiving the SIP_503_RESPONSE message, the source of the SIP_INVITE message disconnects a call.

In S17, the UE #A receives the SIP_503_RESPONSE message and disconnects the call.

In S18, an SIP_183_RESPONSE message transmitted by the UE 3 that received the SIP_INVITE message transmitted by the UE #A reaches the SIP proxy call control server P1. The status code 183 indicates that a session is being established. In S19, the SIP proxy call control server P1 discards the received SIP_183_RESPONSE message due to the congestion.

As illustrated in FIG. 4, when the congestion occurs in the network due to the SIP vulnerability attack, even a call originated by a valid subscriber terminal is disconnected. In addition, a newly originated call and an existing call may be affected and a service may be stopped.

An object of an aspect of an embodiment is to provide a call control device, a call control method, and a call control system that may suppress the occurrence of congestion caused by an attack.

Hereinafter, the embodiment is described with reference to the accompanying drawings. Configurations described in the embodiment are examples, and the embodiment is not limited to the configurations described in the embodiment.

Embodiment

Figure 1:
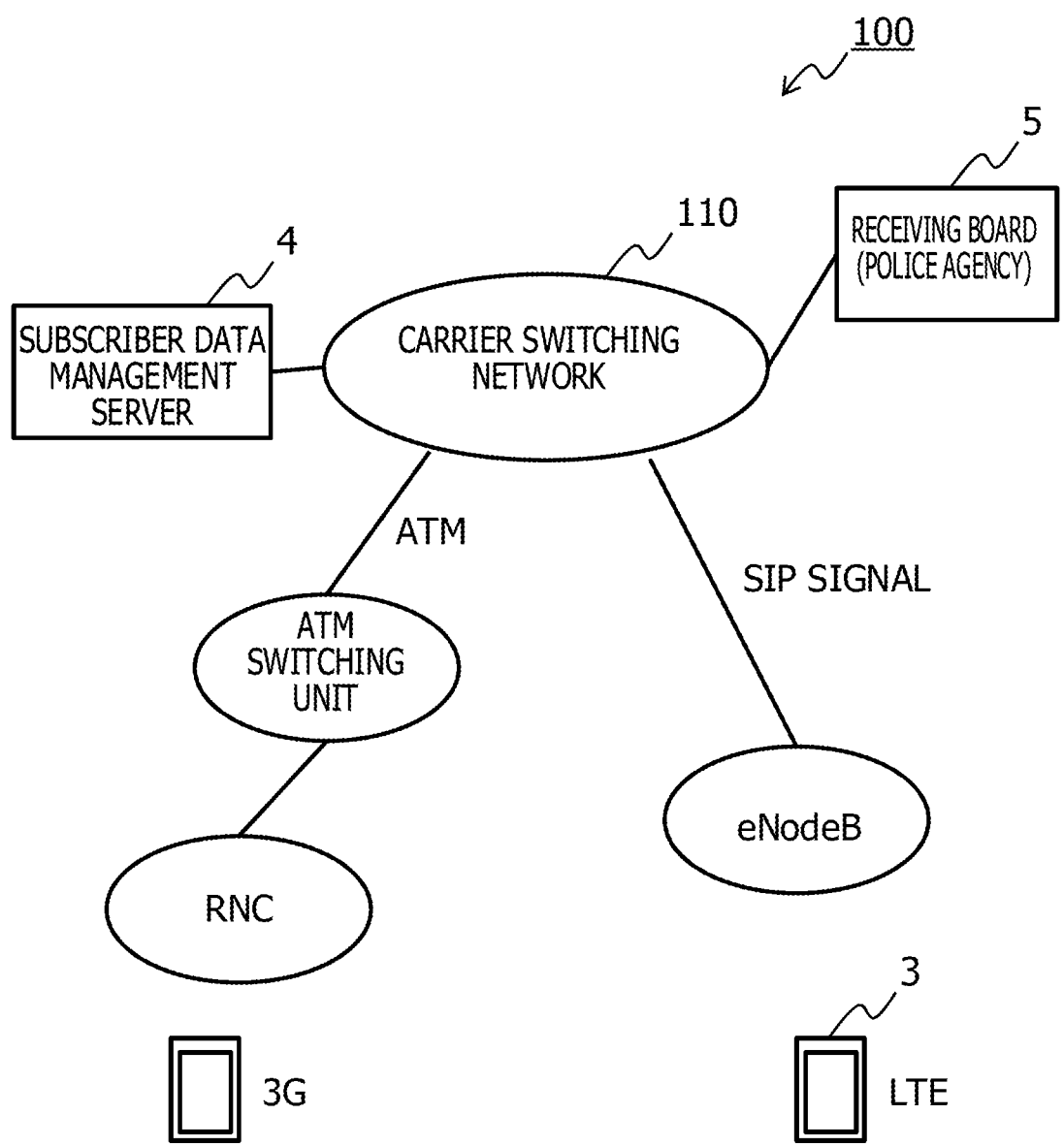
FIG. 1 illustrates an example of a network system in which the SIP is used.
Figure 2:
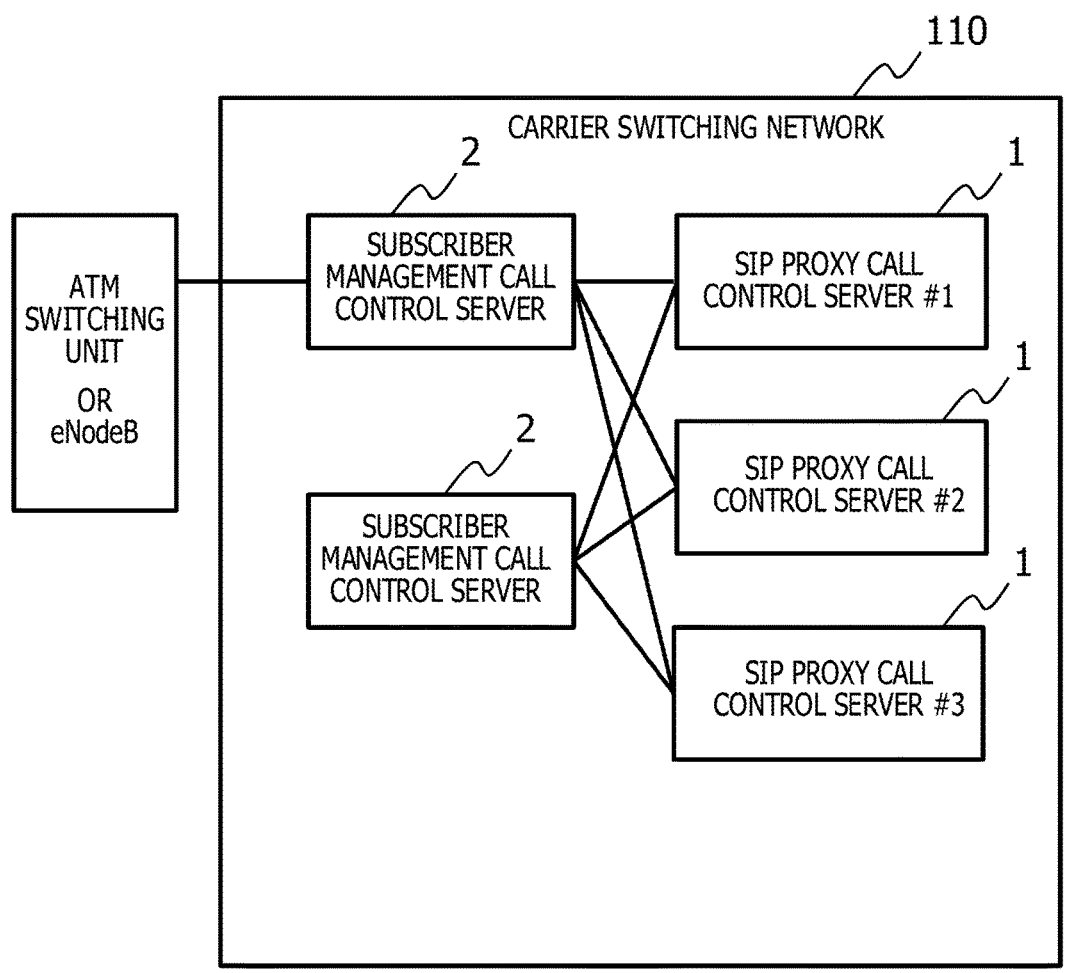
FIG. 2 is a diagram illustrating an example of a system configuration of a carrier switching network.
Figure 3:
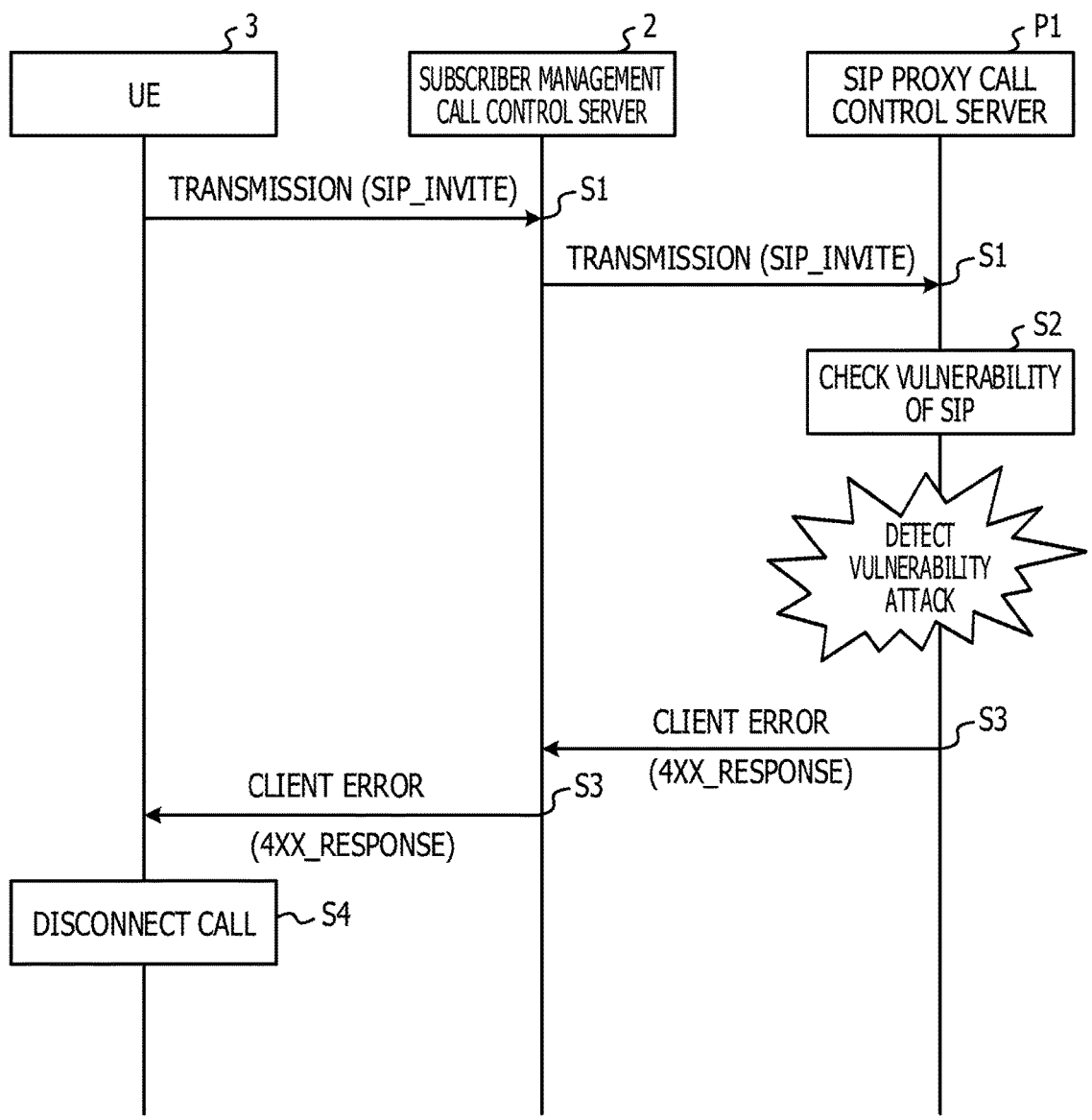
FIG. 3 is a diagram illustrating an example of a sequence of a process to be executed in the carrier switching network when an SIP vulnerability attack signal is received.

The embodiment assumes that a system configuration of a network system and a system configuration of a carrier switching network are the same as or similar to those illustrated in FIGS. 1 and 2. In the embodiment, however, a network system 100 includes a carrier switching network 110, UE 3, a subscriber data management server 4, and a receiving board 5. The receiving board 5 is an IP-private branch exchange (IP-PBX) compliant with the SIP and installed in an institution that is a police agency or the like and collects information of sources of SIP vulnerability attack signals.

If an SIP proxy call control server 1 checks vulnerability and thereby determines an SIP vulnerability attack from the UE 3 that is a source of an SIP_INVITE message, the SIP proxy call control server 1 requests the subscriber data management server 4 to change a registration state of subscriber information of the source UE 3 to an unregistered state. Since a call request transmitted by UE 3 of which subscriber information is not registered in the subscriber data management server 4 is rejected by the subscriber management call control server 2, a subsequent SIP vulnerability attack is blocked before reaching the SIP proxy call control server 1. The SIP_INVITE message is an example of a "call request signal".

In the embodiment, the SIP proxy call control server 1 checks the vulnerability of the SIP_INVITE message. If the vulnerability of the SIP_INVITE message is unacceptable, the SIP proxy call control server 1 transmits an SIP_180_RESPONSE message to the source of the SIP_INVITE message without transmitting an SIP_4XX_RESPONSE message. A status code that is in the 100s is a code indicating that a process is normally executed. The status code 180 indicates that a call is being made.

A RESPONSE message of which a status code is in the 100s is normally transmitted by destination UE 3. Thus, when receiving the SIP_180_RESPONSE message, the source UE 3 determines that the source UE 3 received the SIP_180_RESPONSE message from the destination UE and thus maintains the call. During the time when the call is maintained, a call request using a CALL-ID used for the call may be suppressed.

In the conventional process executed upon the reception of an SIP vulnerability attack signal, if the result of checking the vulnerability indicates that the vulnerability is unacceptable, the SIP proxy call control server transmits the SIP_4XX_RESPONSE message to the UE 3 or the source of the SIP vulnerability attack signal, terminates the process, and does not identify the source UE 3. In the embodiment, the SIP proxy call control server 1 checks the vulnerability of an SIP_INVITE message and acquires subscriber information of source UE 3 from the subscriber data management server 4 if the SIP proxy call control server 1 determines that the SIP proxy call control server 1 received an SIP vulnerability attack. The SIP proxy call control server 1 notifies the receiving board 5 of the subscriber information of the UE 3 that is the source of the acquired SIP vulnerability attack signal. Thus, the SIP proxy call control server 1 may share information of vulnerability attackers with another network system and avoid future SIP vulnerability attacks made by the same source. The receiving board 5 is an example of a "predetermined destination device".

Device Configurations

Figure 5:
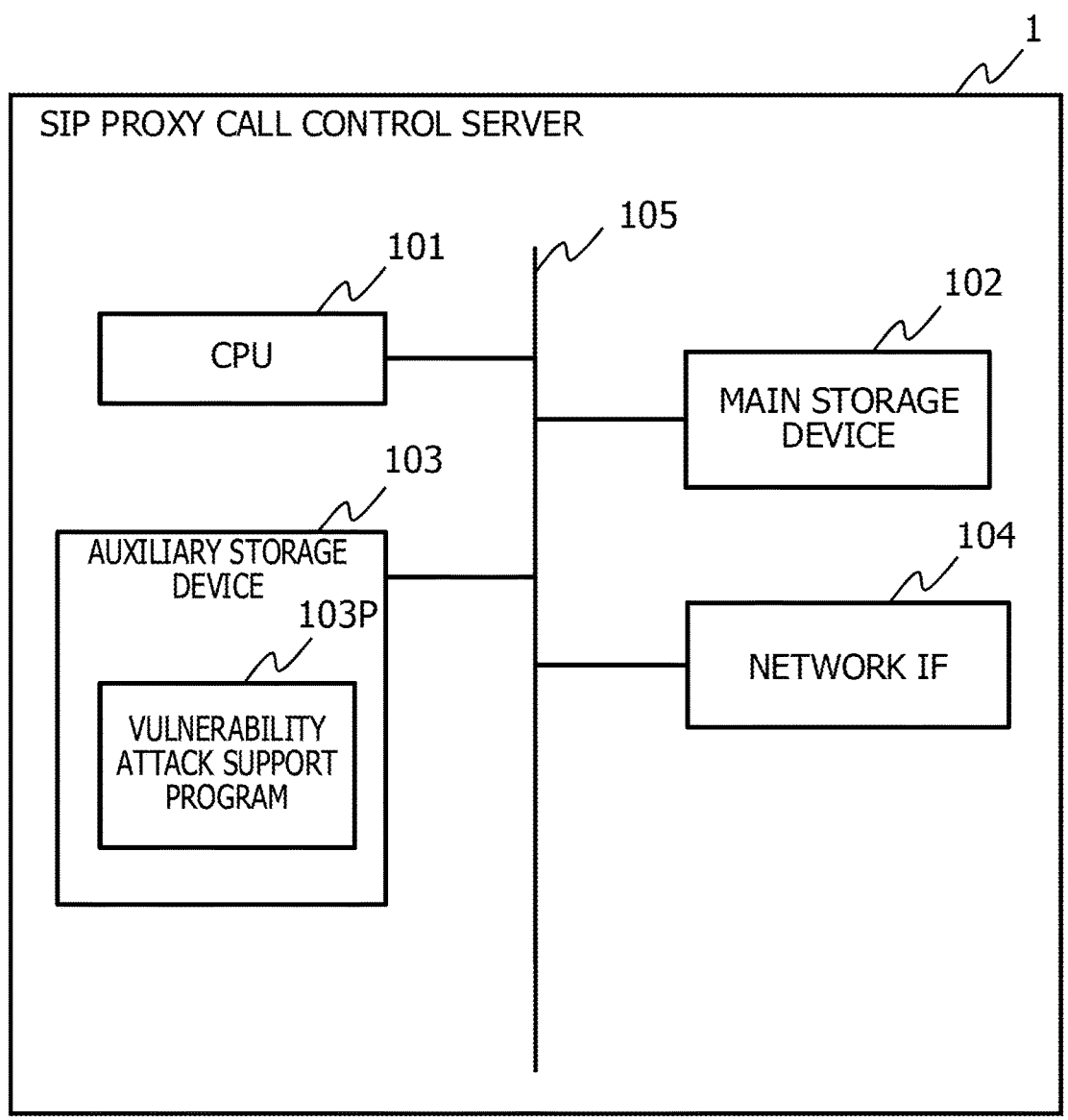
FIG. 5 is a diagram illustrating an example of a hardware configuration of an SIP proxy call control server.

FIG. 5 is a diagram illustrating an example of a hardware configuration of the SIP proxy call control server 1. The SIP proxy call control server 1 is, for example, a dedicated or general-purpose computer. The embodiment assumes that the SIP proxy call control server 1 is a dedicated computer. The SIP proxy call control server 1 includes a central processing unit (CPU) 101, a main storage device 102, an auxiliary storage device 103, and a network interface 104. The CPU 101, the storage device 102, the auxiliary storage device 103, and the network interface 104 are electrically connected to each other by a bus 105. The SIP proxy call control server 1 is an example of a "call control device".

The auxiliary storage device 103 stores various programs and data that is used by the CPU 101 to execute the programs. The auxiliary 103 is, for example, a nonvolatile memory such as an erasable program ROM (EPROM), a flash memory, a hard disk drive (HDD). The auxiliary storage device 103 holds an operating system (OS), an SIP proxy server program, a vulnerability attack support program 103P, and other various application programs, for example. The SIP proxy server program is a program to be executed to cause the computer to operate as an SIP proxy server. The vulnerability attack support program 103P is a program to be executed to detect an SIP vulnerability attack and support the SIP. The vulnerability attack support program 103P is, for example, a module of the SIP proxy server program.

The main storage device 102 is used as a buffer and provides, to the CPU 101, a storage region and work region into which the programs stored in the auxiliary storage device 103 are loaded. The main storage device 102 includes a volatile semiconductor memory such as a random access memory (RAM), for example.

The CPU 101 executes various processes by loading the OS and various application programs held by the auxiliary storage device 103 into the main storage device 102 and executing the OS and the application programs. The number of CPUs 101 is not limited to one, and the SIP proxy call control server 1 may include a plurality of CPUs 101.

The network interface 104 receives and outputs information from and to a network. The network interface 104 includes an interface connected to a wired network and an interface connected to a wireless network. The network interface 104 is, for example, a network interface card (NIC), a wireless local area network (LAN), or the like. Data and the like that are received by the network interface 104 are output to the CPU 101.

The hardware configuration of the SIP proxy call control server 1 that is illustrated in FIG. 5 is an example and is not limited to the above description. The constituent elements of the SIP proxy call control server 1 may be omitted or replaced with other elements in the embodiment, and an element may be added to the hardware configuration of the SIP proxy call control server 1 in the embodiment. For example, the SIP proxy call control server 1 may include a portable recording medium driving device and execute a program stored in a portable recording medium. The portable recording medium is, for example, a recording medium such as an SD card, a mini-SD card a micro-SD card, a universal serial bus (USB) flash memory, a compact disc (CD), a digital versatile disc (DVD), a Blu-ray (registered trademark) disc, or a flash memory card, for example. If the SIP proxy call control server 1 is a general-purpose computer, the SIP proxy call control server 1 may include input devices such as a keyboard and a mouse and output devices such as a display and a printer.

Figure 6:
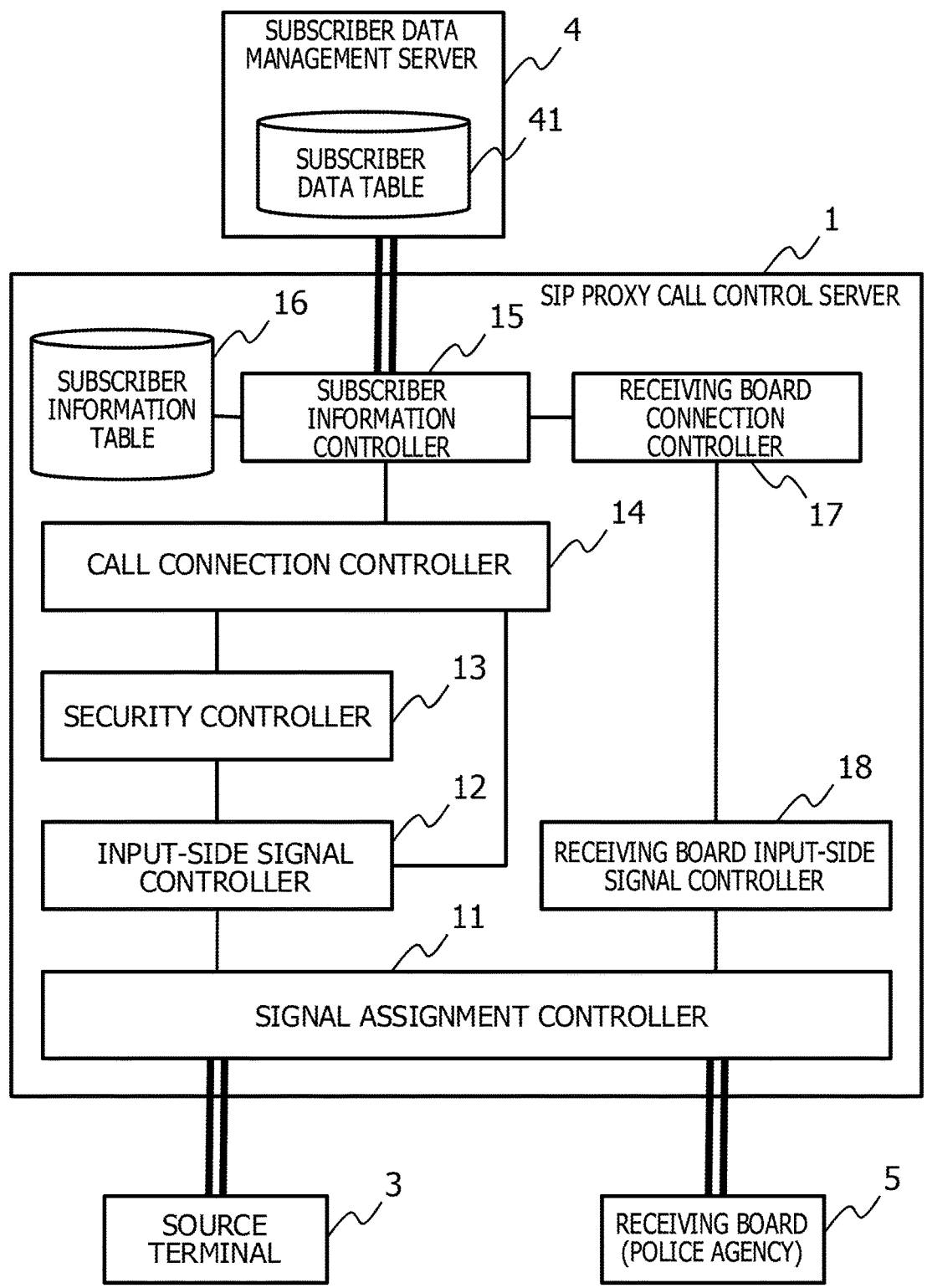
FIG. 6 is a diagram illustrating an example of a functional configuration of the SIP proxy call control server.

FIG. 6 is a diagram illustrating an example of a functional configuration of the SIP proxy call control server 1. The SIP proxy call control server 1 includes, as functional elements, a signal assignment controller 11, input-side signal controllers 12, a security controller 13, a call connection controller 14, a subscriber information controller 15, a subscriber information table 16, a receiving board connection controller 17, and a receiving board input-side signal controller 18. The functional elements are achieved by causing the CPU 101 of the SIP proxy call control server 1 to execute the SIP proxy server program and vulnerability attack support program 103P stored in the auxiliary storage device 103. For example, the call connection controller 14, the subscriber information controller 15, the subscriber information table 16, the receiving board connection controller 17, and the receiving board input-side signal controller 18 are achieved by causing the CPU 101 to execute the vulnerability attack support program 103P stored in the auxiliary storage device 103.

The signal assignment controller 11 receives an SIP signal from the subscriber management call control server 2 or UE 3 and assigns the SIP signal to an input-side signal controller 12 corresponding to a call to be established based on the SIP signal. In the embodiment, SIP signals received by the SIP proxy call control server 1 from the subscriber management call control server 2 and the UE 3 are SIP_INVITE messages, and the SIP signals are limited to SIP_INVITE messages in the following description.

The input-side signal controllers 12 exist for the number of calls to be processed by the SIP proxy call control server 1. In FIG. 6, one input-side signal controller 12 is illustrated for convenience sake. A call is identified by a combination of a phone number of a call source, a phone number of a call destination, and a CALL-ID that are included in an SIP_INVITE message, for example. If the combination of the phone number of the call source UE 3, and the phone number of the call destination UE 3, and the CALL-ID that are included in the SIP_INVITE message is a new combination, the SIP_INVITE message is identified as a new call and a new input-side signal controller 12 is generated. The input-side signal controllers 12 are each an example of a receiver.

The input-side signal controller 12 receives the SIP_INVITE message of the assigned call from the signal assignment controller 11 and terminates the SIP_INVITE message. In addition, the input-side signal controller 12 requests the security controller 13 to check the vulnerability of the received SIP_INVITE message.

If the result of checking the vulnerability indicates that the vulnerability is acceptable, the security controller 13 notifies the input-side signal controller 12 that the result of checking the vulnerability indicates that the vulnerability is acceptable. When receiving the notification indicating that the vulnerability is acceptable, the input-side signal controller 12 transmits the SIP_INVITE message to the UE 3 that is the destination of the SIP_INVITE message.

If the result of checking the vulnerability indicates that the vulnerability is unacceptable, the input-side signal controller 12 receives multiple types of SIP_RESPONSE messages from the call connection controller 14 and transmits the SIP_RESPONSE messages to the UE 3 that is the source of the SIP_INVITE message. Details of the SIP_RESPONSE messages received by the input-side signal controller 12 from the call connection controller 14 are described later.

The security controller 13 receives the request from the input-side signal controller 12 and checks the vulnerability of the SIP_INVITE message. The security controller 13 checks the vulnerability by determining whether or not the format of the SIP_INVITE message, values of fields within a header of the SIP_INVITE message, a character string included in a data field of the SIP_INVITE message, and the like are already reported to IPA as an SIP vulnerability attack signal. Information of SIP_INVITE messages that is reported to IPA is stored in the auxiliary storage device 103 in advance.

If the format of the SIP_INVITE message, the values of the fields within the header, the character string included in the data field of the SIP_INVITE message, and the like are already reported to IPA as the SIP vulnerability attack signal, the security controller 13 determines that the result of checking the vulnerability indicates that the vulnerability is unacceptable. If the format of the SIP_INVITE message, the values of the fields within the header, the character string included in the data field of the SIP_INVITE message, and the like are not reported to IPA, the security controller 13 determines that the result of checking the vulnerability indicates that the vulnerability is acceptable.

If the result of checking the vulnerability of the SIP_INVITE message indicates that the vulnerability is acceptable, the security controller 13 notifies the corresponding input-side signal controller 12 that the result of checking the vulnerability of the SIP_INVITE message indicates that the vulnerability is acceptable. If the result of checking the vulnerability of the SIP_INVITE message indicates that the vulnerability is unacceptable, the security controller 13 notifies the call connection controller 14 that the result of checking the vulnerability of the SIP_INVITE message indicates that the vulnerability is unacceptable. The security controller 13 is an example of a "determining unit".

When receiving, from the security controller 13, the notification indicating that the result of checking the vulnerability of the SIP_INVITE message indicates that the vulnerability is unacceptable, the call connection controller 14 transmits, to the subscriber information controller 15, a subscriber information acquisition request that is a request to acquire subscriber information of the UE 3 that is the source of the SIP_INVITE message. In addition, the call connection controller 14 generates an SIP_180_RESPONSE message for the UE 3 or the source of the SIP_INVITE message and transmits the SIP_180_RESPONSE message to the corresponding input-side signal controller 12 together with the transmission of the subscriber information acquisition request.

When receiving, from the subscriber information controller 15, a response to the subscriber information acquisition request, the call connection controller 14 generates an SIP_4XX_RESPONSE message for the UE 3 or the source of the SIP_INVITE message and transmits the generated SIP_4XX_RESPONSE message to the corresponding input-side signal controller 12. The call connection controller 14 is an example of a "generator".

When receiving the subscriber information acquisition request from the call connection controller 14, the subscriber information controller 15 transmits, to the subscriber data management server 4, the subscriber information acquisition request that is the request to acquire the subscriber information of the UE 3 that is the source of the SIP_INVITE message. When receiving, from the subscriber data management server 4, the subscriber information request response including the subscriber information of the source UE 3, the subscriber information controller 15 transmits the subscriber information to the receiving board connection controller 17 in order to transmit the subscriber information to the receiving board 5.

The subscriber information acquisition request includes the phone number of the source UE 3 that is included in the SIP_INVITE message, for example. The subscriber information acquisition request received from the subscriber data management server 4 includes, as the subscriber information, the phone number and IP address of the source UE 3, for example. The phone number and the IP address are information serving as the minimum requirements for identifying the source UE 3.

After the transmission of the subscriber information acquisition request, the subscriber information controller 15 determines whether or not the SIP proxy call control server 1 received an SIP vulnerability attack from the source UE 3 targeted for the subscriber information acquisition request. It may be said that this determination is made as to whether or not a registration state of the source UE 3 in the subscriber data management server 4 is forcibly set to an unregistered state. The UE 3 makes the SIP vulnerability attack by continuously transmitting a large amount of invalid SIP_INVITE messages in many cases, as illustrated in the example of FIG. 4. Thus, the subscriber information controller 15 makes the determination by determining whether or not the SIP proxy call control server 1 received an SIP_INVITE message from the source UE 3 a number T of times or more within a time period of N seconds. N and T are positive integers and may be arbitrarily set by an administrator of the carrier switching network 110.

The subscriber information controller 15 causes information of UE 3, which is a source of an SIP_INVITE message whose result of checking the vulnerability indicates that the vulnerability is unacceptable, to be stored in the subscriber information table 16 that is described later. The subscriber information controller 15 determines, based on the subscriber information table 16, whether or not the SIP proxy call control server 1 received an SIP_INVITE message from the same UE 3 a number T of times or more within a time period of N seconds. The determination of whether or not the SIP proxy call control server 1 received an SIP_INVITE message from the same UE 3 a number T of times or more within a time period of N seconds is described later in detail.

If the subscriber information controller 15 determines that the SIP proxy call control server 1 received an SIP_INVITE message from the same UE 3 a number T of times or more within a time period of N seconds, the subscriber information controller 15 transmits, to the subscriber data management server 4, a subscriber information change request that is a request to forcibly set a registration state of subscriber information of the UE 3 to an unregistered state. The communication between the subscriber information controller 15 and the subscriber data management server 4 is executed using a mobile application part (MAP), but is not limited to this. The subscriber information controller 15 is an example of a "controller".

When receiving, from the subscriber information controller 15, subscriber information of UE 3 that is a source of an SIP_INVITE message whose result of checking vulnerability indicates that the vulnerability is unacceptable, the receiving board connection controller 17 generates an SIP_INFO message including the subscriber information and outputs the SIP_INFO message to the receiving board input-side signal controller 18. When receiving an SIP_200_RESPONSE message that is a response to the SIP_INFO message from the receiving board 5 through the receiving board input-side signal controller 18, the receiving board connection controller 17 outputs the SIP_200_RESPONSE message to the subscriber information controller 15.

The receiving board input-side signal controller 18 is an input-side signal controller for the receiving board 5. A call is not established between the receiving board 5 and the receiving board input-side signal controller 18. The SIP_INFO message and the SIP_200_RESPONSE message or the response to the SIP_INFO message are transmitted and received between the receiving board 5 and the receiving board input-side signal controller 18 without the establishment of a call.

FIG. 7 is illustrates an example of the subscriber information table 16. The subscriber information table 16 is a table storing information of UE 3 that is sources of SIP_INVITE messages whose results of checking vulnerability indicate that the vulnerability of the SIP_INVITE messages is unacceptable. The subscriber information table 16 is used by the subscriber information controller 15 to determine whether or not the SIP proxy call control server 1 received an SIP_INVITE message from the same UE 3 a number T of times or more within a time period of N seconds. The subscriber information table 16 is stored in a storage region of the auxiliary storage device 103 and managed by the subscriber information controller 15.

The subscriber information table 16 includes items for "phone numbers", "times", and "the numbers of times of reception" in entries. In the item for "phone numbers", phone numbers of source UE 3 that are included in SIP_INVITE messages whose results of checking vulnerability indicate that the vulnerability of SIP_INVITE messages are unacceptable are stored.

In the item for "times", times when the SIP_INVITE messages whose results of checking the vulnerability indicate that the vulnerability of the SIP_INVITE messages are unacceptable are first received from the source UE 3 having the "phone numbers" or times when the entries are registered are stored. In the item for "the numbers of times of reception", the numbers of times when the SIP_INVITE messages whose results of checking the vulnerability indicate that the vulnerability of the SIP_INVITE messages are unacceptable are received from the source UE 3 having the "phone numbers".

FIG. 8 illustrates an example of the subscriber data table. The subscriber data table 41 is stored in a storage region of the auxiliary storage device of the subscriber data management server 4. The subscriber data table 41 is a table holding subscriber information of UE 3 whose positions are completely registered. UE 3 that is not registered in the subscriber data table 41 is not permitted to transmit a call request.

The subscriber data table 41 includes items for "phone numbers", "registration states", "addresses", and "forced deregistration flags" in entries. In the item for "phone numbers", phone numbers of the UE 3 whose positions are completely registered are stored.

In the item for "registration states", values that each indicate "registered" or "not registered" are stored. If a value indicates "registered", the value indicates that corresponding UE 3 is able to be used. If the value indicates "not registered", the value indicates that the corresponding UE 3 is not able to be used.

When UE 3 transmits an SIP_REGISTER message and the position of the UE 3 is registered, subscriber information of the UE 3 is registered in the subscriber data table 41. After the completion of the registration of the position, the UE 3 transmits an SIP_REGISTER message at predetermined time intervals. The subscriber data management server 4 receives the SIP_REGISTER message at predetermined time intervals and thereby maintains the value indicating "registered" in a "registration state" of an entry for the subscriber information of the UE 3 in the subscriber data table 41. If the SIP_REGISTER message does not reach the subscriber data management server 4 after a lapse of a predetermined time, the "registration state" of the entry for the subscriber information of the UE 3 is changed to "not registered".

In the embodiment, however, even if the subscriber data management server 4 receives a subscriber information change request from the SIP proxy call control server 1 and is requested to forcibly set a registration state of subscriber information of target UE 3 to an unregistered state, the "registration state" of the subscriber information is changed to "not registered".

In the item for "addresses", IP addresses of the UE 3 whose positions are completely registered are stored. If a "registration state" of UE 3 indicates "registered", an IP address of the UE 3 is stored in an "address". If the registration state" indicates "not registered", any value is not stored in the "address".

The "forced deregistration flag" is a flag indicating that the subscriber data management server 4 was requested by a subscriber information change request from the SIP proxy call control server 1 to forcibly set a registration state to an unregistered state.

When receiving a subscriber information acquisition request from the SIP proxy call control server 1, the subscriber data management server 4 searches the subscriber data table 41 using a phone number included in the subscriber information acquisition request as a key and acquires an IP address from an entry corresponding to the phone number. The subscriber data management server 4 transmits, to the SIP proxy call control server 1, a subscriber information acquisition response including the phone number used as the key and the IP address acquired from the subscriber data table 41.

When receiving a subscriber information change request from the SIP proxy call control server 1, the subscriber data management server 4 searches the subscriber data table 41 using a phone number included in the subscriber information change request as a key. The subscriber data management server 4 sets a "registration state" of an entry corresponding to the phone number to "not registered", sets a "forced deregistration flag" of the entry to "ON", and transmits a subscriber information change response to the SIP proxy call control server 1.

Flow of Process

Figure 9:
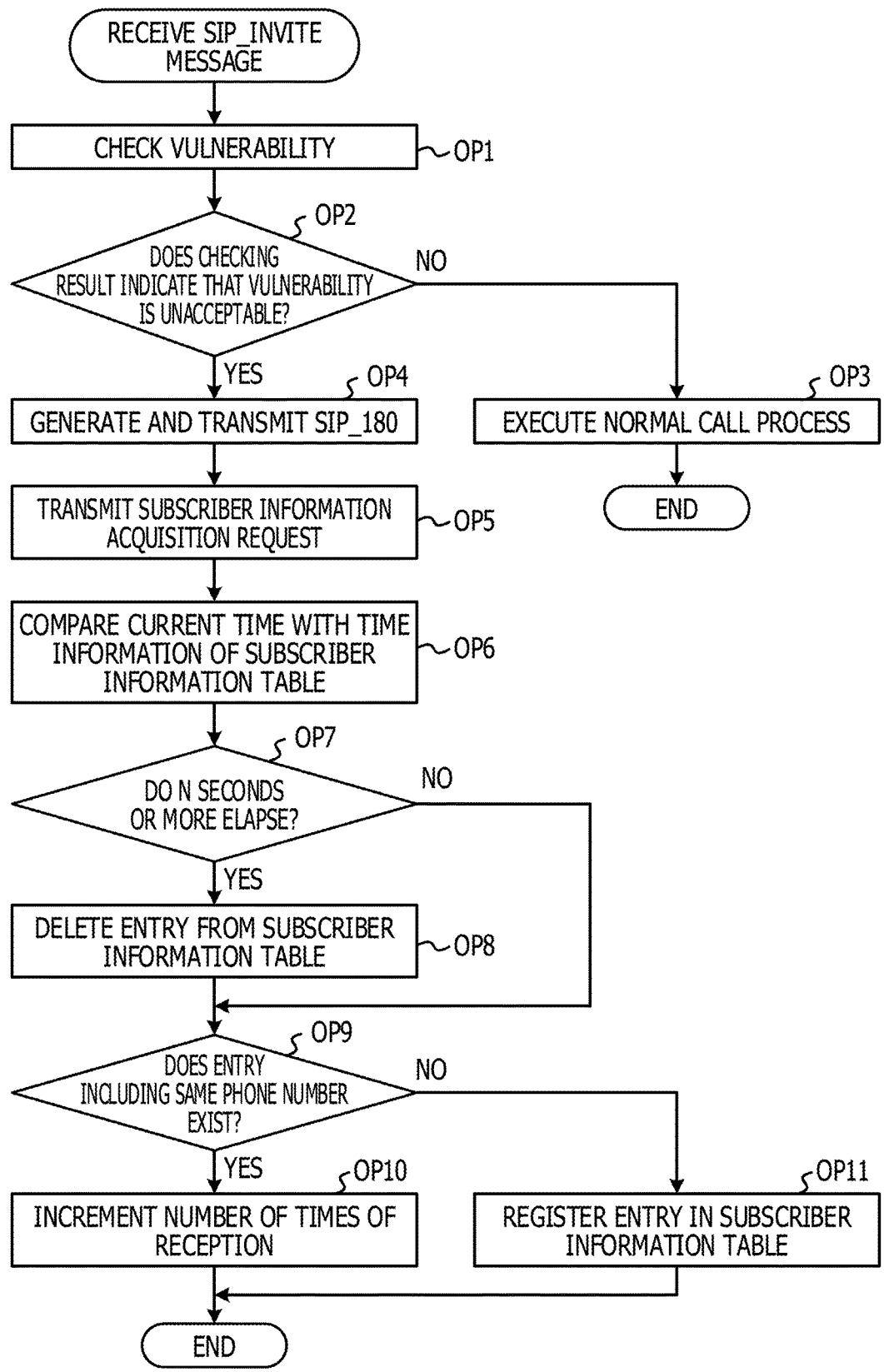
FIG. 9 illustrates an example of a flowchart of a process to be executed by the SIP proxy call control server when the SIP proxy call control server receives an SIP_INVITE message.

FIG. 9 illustrates an example of a flowchart of a process to be executed by the SIP proxy call control server 1 when the SIP proxy call control server 1 receives an SIP_INVITE message. The process illustrated in FIG. 9 is started when the SIP proxy call control server 1 receives an SIP_INVITE message. In the following process of the flowchart, the CPU 101 that is an actual main element executes operations. For convenience sake, however, functional elements assigned to processes included in the following process are described as main elements.

In OP1, the security controller 13 checks the vulnerability of an SIP_INVITE message received through the signal assignment controller 11 and a corresponding input-side signal controller 12. Next, the process proceeds to OP2.

In OP2, the security controller 13 determines the result of checking the vulnerability of the SIP_INVITE message. If the result of checking the vulnerability indicates that the vulnerability is acceptable (No in OP2), the security controller 12 notifies the corresponding input-side signal controller 12 that the result of checking the vulnerability indicates that the vulnerability is acceptable. Then, the process proceeds to OP3. In OP3, the input-side signal controller 12 transmits the received SIP_INVITE message to destination UE 3, like a normal call process. After that, the process illustrated in FIG. 9 is terminated.

If the result of checking the vulnerability indicates that the vulnerability is unacceptable (Yes in OP2), the security controller 13 notifies the call connection controller 14 that the result of checking the vulnerability indicates that the vulnerability is unacceptable. Then, the process proceeds to OP4.

In OP4, the call connection controller 14 generates an SIP_180_RESPONSE message and transmits the generated SIP_180_RESPONSE message to the corresponding input-side signal controller 12. The SIP_180_RESPONSE message is transmitted through the signal assignment controller 11 to UE 3 that is a source of the received SIP_INVITE message. Then, the process proceeds to OP5.

In OP5, the call connection controller 14 outputs a subscriber information acquisition request to the subscriber information controller 15, and the subscriber information controller 15 transmits the subscriber information acquisition request to the subscriber data management server 4. Then, the process proceeds to OP6.

In OP6, the subscriber information controller 15 compares a current time with a "time" ("time information" in FIG. 9) indicated in an entry included in the subscriber information table 16 and corresponding to a phone number included in the received SIP_INVITE message. Then, the process proceeds to OP7.

In OP7, the subscriber information controller 15 determines whether or not N seconds or more elapse after the "time" indicated in the corresponding entry of the subscriber information table 16 or whether or not N seconds or more elapse after the SIP_INVITE message including the phone number is first received. If N seconds or more elapse after the "time" indicated in the corresponding entry of the subscriber information table 16 (Yes in OP7), the process proceeds to OP8. If N seconds or more do not elapse after the "time" indicated in the corresponding entry of the subscriber information table 16 (No in OP7), the process proceeds to OP9.

In OP8, the subscriber information controller 15 determines that N seconds or more do not elapse after the "time" indicated in the corresponding entry of the subscriber information table 16 and that the SIP proxy call control server 1 does not receive an SIP vulnerability attack from the UE 3 that is the source of the received SIP_INVITE message. The subscriber information controller 15 deletes the corresponding entry from the subscriber information table 16. Then, the process proceeds to OP9.

In OP9, the subscriber information controller 15 determines whether or not an entry including the same phone number as that included in the received SIP_INVITE message exists in the subscriber information table 16. If the entry including the same phone number as that included in the received SIP_INVITE message exists in the subscriber information table 16 (Yes in OP9), the process proceeds to OP10. If the entry including the same phone number as that included in the received SIP_INVITE message does not exist in the subscriber information table 16 (No in OP9), the process proceeds to OP11.

In OP10, the subscriber information controller 15 updates the current "number of times of reception" within the entry so as to add 1 to the current "number of times of reception" within the entry, since the entry including the same phone number as that included in the received SIP_INVITE message exists in the subscriber information table 16. After that, the process illustrated in FIG. 9 is terminated.

In OP11, the subscriber information controller 15 registers an entry for the received SIP_INVITE message in the subscriber information table 16, since the entry including the same phone number as that included in the received SIP_INVITE message does not exist in the subscriber information table 16. The "number of times of reception" within the newly registered entry is 1. After that, the process illustrated in FIG. 9 is terminated.

If the entry that corresponds to the phone number included in the received SIP_INVITE message does not exist in the subscriber information table 16 in OP6, the process proceeds from OP 7 to OP9 and further proceeds from OP9 to OP11. In OP11, an entry is newly registered for the received SIP_INVITE message in the subscriber information table 16.

If the entry that corresponds to the phone number included in the received SIP_INVITE message is deleted from the subscriber information table 16 in OP8, the process proceeds from OP9 to OP11. In OP11, an entry is newly registered for the received SIP_INVITE message in the subscriber information table 16.

Figure 10:
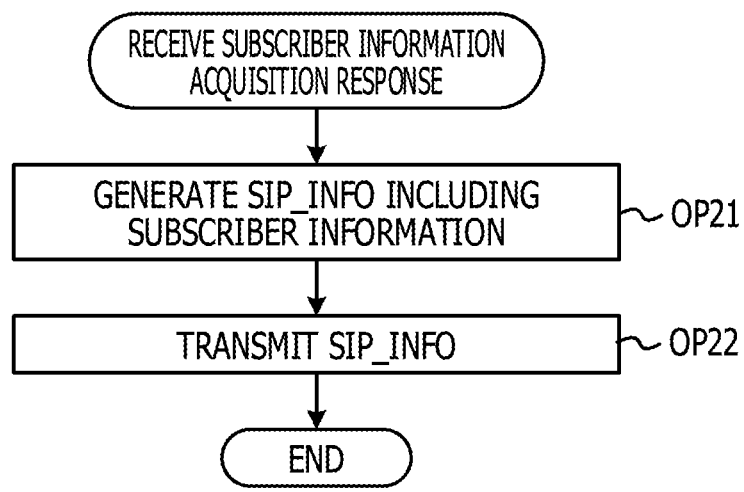
FIG. 10 illustrates an example of a flowchart of a process to be executed by the SIP proxy call control server when the SIP proxy call control server receives a subscriber information acquisition response.

FIG. 10 illustrates an example of a flowchart of a process to be executed by the SIP proxy call control server 1 when the SIP proxy call control server 1 receives a subscriber information acquisition response to the subscriber information acquisition request transmitted in OP5 illustrated in FIG. 9. The process illustrated in FIG. 10 is started when the subscriber information controller 15 receives the subscriber information acquisition response from the subscriber data management server 4.

In OP21, the subscriber information controller 15 extracts subscriber information from the subscriber information acquisition request and outputs the subscriber information to the receiving board connection controller 17. The receiving board connection controller 17 receives the subscriber information from the subscriber information controller 15 and generates an SIP_INFO message including the subscriber information. The subscriber information includes a phone number and IP address of the UE 3 that is the source of the SIP_INVITE message whose result of checking the vulnerability indicates that the vulnerability is unacceptable. Next, the process proceeds to OP22.

In OP22, the receiving board connection controller 17 outputs the generated SIP_INFO message to the receiving board input-side signal controller 18, and the receiving board input-side signal controller 18 transmits the SIP_INFO message to the receiving board 5 through the signal assignment controller 11. After that, the process illustrated in FIG. 10 is terminated.

Figure 11:
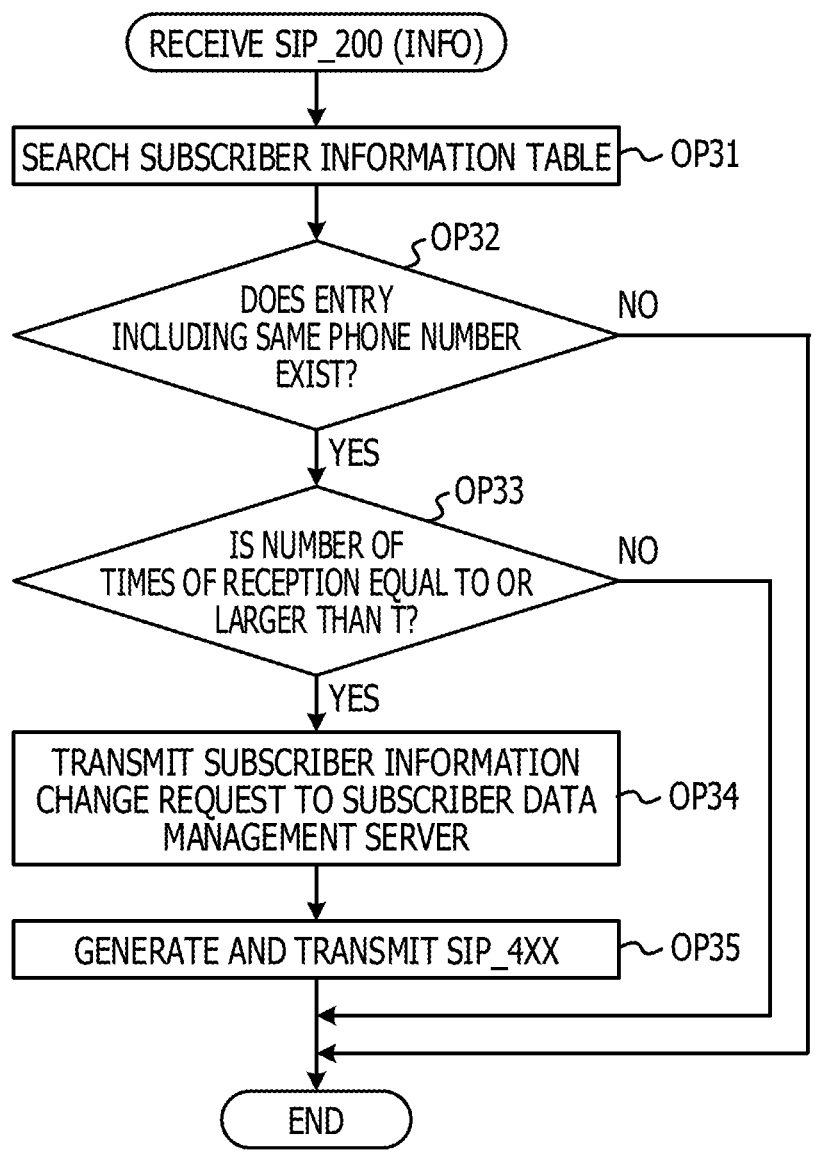
FIG. 11 illustrates an example of a flowchart of a process to be executed by the SIP proxy call control server when the SIP proxy call control server receives an SIP_200_RESPONSE message.

FIG. 11 illustrates an example of a flowchart of a process to be executed by the SIP proxy call control server 1 when the SIP proxy call control server 1 receives an SIP_200_RESPONSE message that is a response to the SIP_INFO message transmitted in OP22 illustrated in FIG. 10. The process illustrated in FIG. 11 is started when the receiving board input-side signal controller 18 receives the SIP_200_RESPONSE message from the receiving board 5 through the signal assignment controller 11.

In OP31, the subscriber information controller 15 receives, from the receiving board connection controller 17, a notification indicating that the receiving board input-side signal controller 18 received the SIP_200_RESPONSE message from the receiving board 5, and the subscriber information controller 15 searches the subscriber information table 16 using, as a key, a phone number reported by the SIP_INFO message to the receiving board 5. Then, the process proceeds to OP32. The phone number reported by the SIP_INFO message to the receiving board 5 is the same as the phone number included in the SIP_INVITE message received in the process illustrated in FIG. 9 and is hereinafter merely referred to as the phone number included in the received SIP_INVITE message.

In OP32, the subscriber information controller 15 determines whether or not an entry that includes the same phone number as that included in the received SIP_INVITE message exists in the subscriber information table 16. If the entry that includes the same phone number as that included in the received SIP_INVITE message exists in the subscriber information table 16 (Yes in OP32), the process proceeds to OP33. It is not expected that the entry that includes the same phone number as that included in the received SIP_INVITE message does not exist in the subscriber information table 16 in the first embodiment. Thus, if the entry that includes the same phone number as that included in the received SIP_INVITE message does not exist in the subscriber information table 16 (No in OP32), an error occurs and the process illustrated in FIG. 11 is terminated.

In OP33, the subscriber information controller 15 determines whether or not the "number of times of reception" within the entry including the same phone number as that included in the received SIP_INVITE message is equal to or larger than T in the subscriber information table 16. If the "number of times of reception" is equal to or larger than T (Yes in OP33), the process proceeds to OP34. If the "number of times of reception" is smaller than T (No in OP33), the subscriber information controller 15 determines that the SIP proxy call control server 1 does not receive an SIP vulnerability attack from the UE 3 having the phone number included in the received SIP_INVITE message, and the process illustrated in FIG. 11 is terminated.

In OP34, the "number of times of reception" within the entry included in the subscriber information table 16 is equal to or larger than T, and the subscriber information controller 15 determines that the SIP proxy call control server 1 received an SIP vulnerability attack from the UE 3 having the phone number included in the received SIP_INVITE message. The subscriber information controller 15 transmits, to the subscriber data management server 4, a subscriber information change request that is a request to forcibly deregister subscriber information of the UE 3 having the phone number included in the received SIP_INVITE message. Then, the process proceeds to OP35.

In OP35, the subscriber information controller 15 outputs a response to the subscriber information acquisition request to the call connection controller 14, and the call connection controller 14 receives the response, generates an SIP_4XX_RESPONSE message, and outputs the generated SIP_4XX_RESPONSE message to the corresponding input-side signal controller 12. The SIP_4XX_RESPONSE message is transmitted through the corresponding input-side signal controller 12 and the signal assignment controller 11 to the UE 3 that is the source of the received SIP_INVITE message. After that, the process illustrated in FIG. 11 is terminated.

Figure 12:
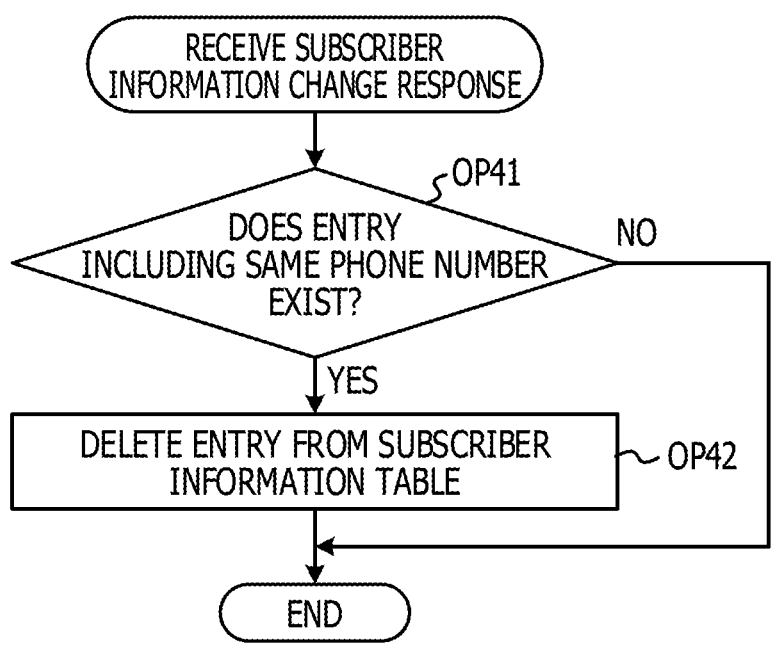
FIG. 12 illustrates an example of a sequence of a process to be executed by the SIP proxy call control server when the SIP proxy call control server receives a subscriber information change response.

FIG. 12 illustrates an example of a flowchart of a process to be executed by the SIP proxy call control server 1 when the SIP proxy call control server 1 receives a subscriber information change response to the subscriber information change request transmitted in OP34 illustrated in FIG. 11. The process illustrated in FIG. 12 is started when the subscriber information controller 15 receives the subscriber information change response from the subscriber data management server 4.

In OP41, the subscriber information controller 15 determines whether or not an entry that includes the same phone number as that corresponding to the subscriber information change response exists in the subscriber information table 16. The phone number corresponding to the subscriber information change response is the same as the phone number included in the SIP_INVITE message received in the process illustrated in FIG. 9 and is hereinafter merely referred to as the phone number included in the received SIP_INVITE message.

If the entry that includes the same phone number as that included in the received SIP_INVITE message exists in the subscriber information table 16 (Yes in OP41), the process proceeds to OP42. Since it is not expected that the entry that includes the same phone number as that included in the received SIP_INVITE message does not exist in the subscriber information table 16 in the first embodiment. Thus, if the entry that includes the same phone number as that included in the received SIP_INVITE message does not exist in the subscriber information table 16 (No in OP41), an error occurs and the process illustrated in FIG. 12 is terminated.

In OP42, the subscriber information controller 15 deletes the entry from the subscriber information table 16. The subscriber information of the UE 3 having the phone number included in the received SIP_INVITE message is deregistered from the subscriber data management server 4, and an SIP_INVITE message transmitted by the UE 3 having the phone number does not reach the SIP proxy call control server 1 after the deregistration. Since the entry that includes the phone number in the subscriber information table 16 becomes unwanted, the entry is deleted. After that, the process illustrated in FIG. 12 is terminated.

The flowcharts illustrated in FIGS. 9 to 12 are examples. Whether or not the process blocks included in the flowcharts are executed and the orders that the process blocks are executed are not limited to those illustrated in FIGS. 9 to 12. For example, if subscriber information included in an SIP_INVITE message whose result of checking vulnerability indicates that the vulnerability is unacceptable is not reported to the receiving board 5, the process of OP5 illustrated in FIG. 9 and the processes of OP21 and OP22 illustrated in FIG. 10 may not be executed and the process may proceed from the process of OP10 illustrated in FIG. 9 to the process of OP31 illustrated in FIG. 11.

SPECIFIC EXAMPLE

Figure 13A:
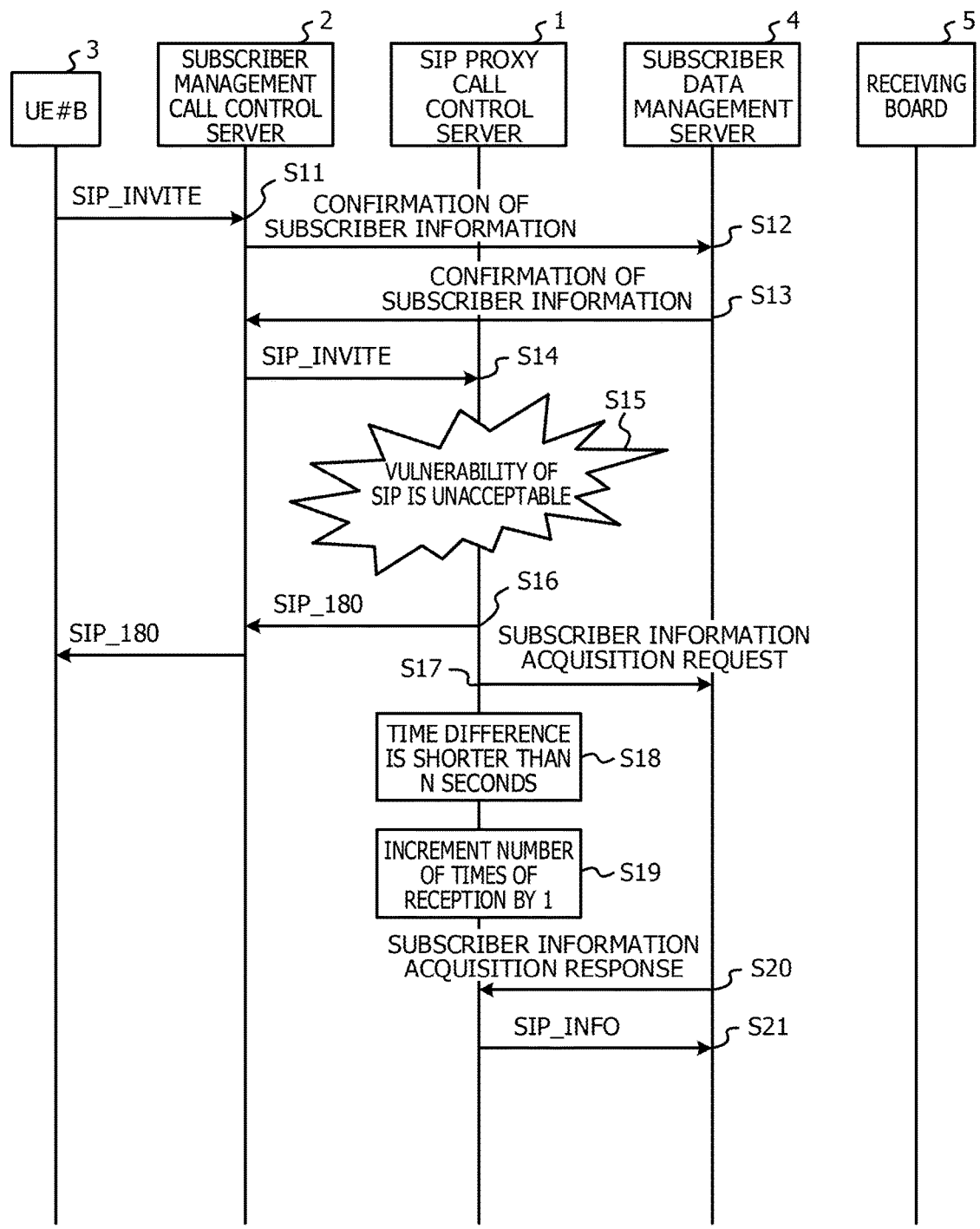
FIG. 13A is a diagram illustrating an example of a sequence of a process to be executed by a network system when an SIP vulnerability attack is made.
Figure 13B:
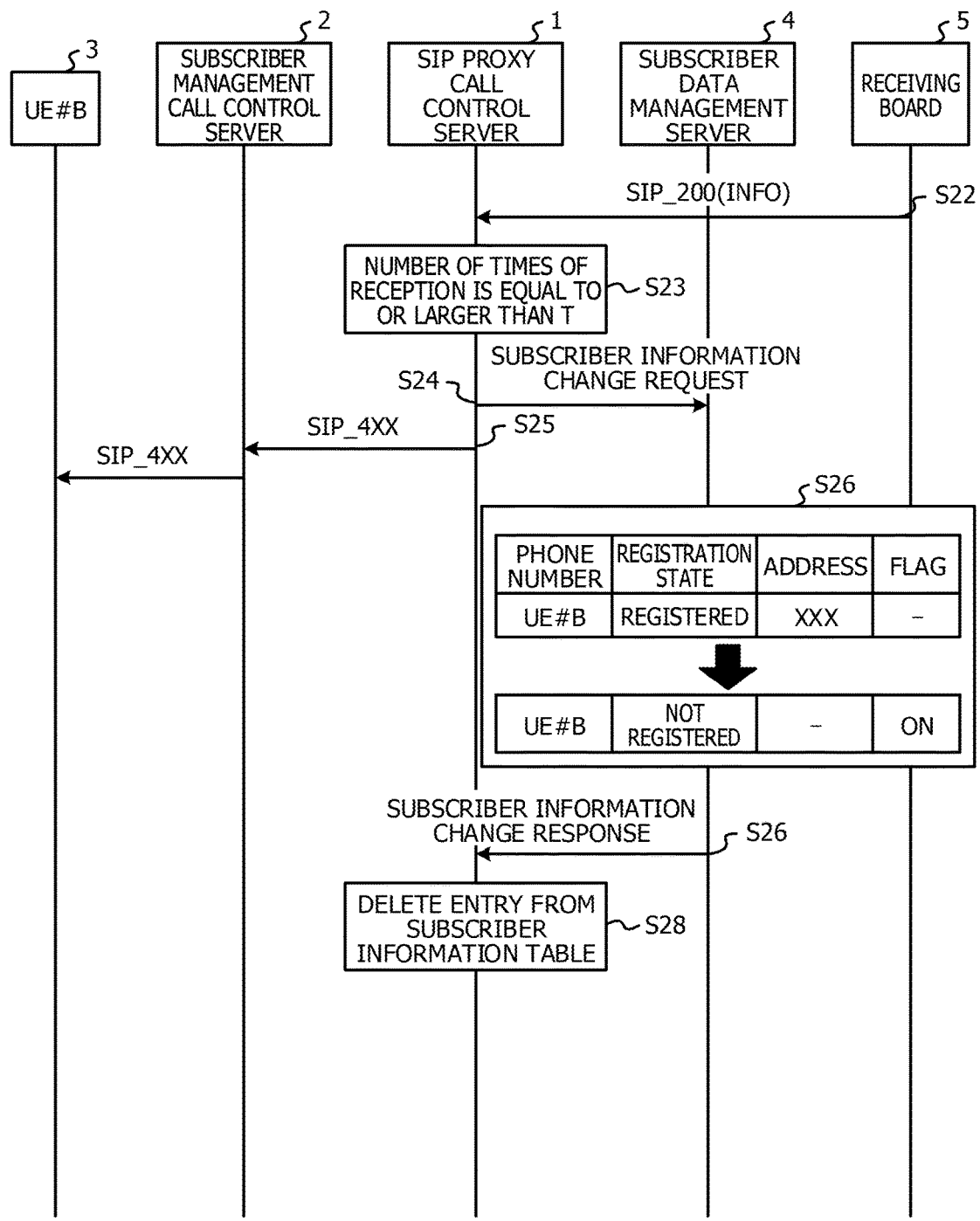
FIG. 13B is a diagram illustrating the example of the sequence of the process to be executed by the network system when the SIP vulnerability attack is made.

FIGS. 13A and 13B illustrate an example of a sequence of a process to be executed by the network system 100 when an SIP vulnerability attack is made. It is assumed that UE #B is a terminal that makes the SIP vulnerability attack. In addition, it is assumed that subscriber information of the UE #B is registered in the subscriber data table 41 of the subscriber data management server 4.

In S11, the UE #B transmits an SIP_INVITE message that is an SIP vulnerability attack signal. It is assumed that the SIP_INVITE message is transmitted for the T-th time. In S12, the subscriber management call control server 2 receives the SIP_INVITE message transmitted by the UE #B and inquires of the subscriber data management server 4 so as to confirm whether or not the subscriber information of the UE #B is already registered in the subscriber data management server 4. In S13, the subscriber data management server 4 responds to the inquiry from the subscriber management call control server 2 or provides the response indicating that the subscriber information of the UE #B is already registered in the subscriber data management server 4.

In S14, the subscriber management call control server 2 transfers the SIP_INVITE message received from the UE #B to the SIP proxy call control server 1, since the subscriber management call control server 2 confirms that the subscriber information of the UE #B is already registered in the subscriber data management server 4.

In S15, the SIP proxy call control server 1 checks the vulnerability of the received SIP_INVITE message (in OP1 illustrated in FIG. 9) and determines that the result of checking the vulnerability indicates that the vulnerability is unacceptable (Yes in OP2 illustrated in FIG. 9). Since the result of checking the vulnerability indicates that the vulnerability is unacceptable, the SIP proxy call control server 1 transmits an SIP_180_RESPONSE message to the UE #B in S16 (in OP4 illustrated in FIG. 9).

In S17, the SIP proxy call control server 1 transmits, to the subscriber data management server 4, a subscriber information acquisition request that is a request to acquire the subscriber information of the UE #B (in OP5 illustrated in FIG. 9). The subscriber information acquisition request includes a phone number of the UE #B.

In S18, the SIP proxy call control server 1 compares the current time with a "time" indicated in an entry corresponding to the phone number of the UE #B in the subscriber information table 16 (in OP6 illustrated in FIG. 9) and determines that the difference between the current time and the "time" is shorter than N seconds (No in OP7 illustrated in FIG. 9).

In S19, the SIP proxy call control server 1 adds 1 to a value of the "number of times of reception" within the entry corresponding to the phone number of the UE #B in the subscriber information table 16 (Yes in OP9 illustrated in FIG. 9 and OP10 illustrated in FIG. 9). Since it is assumed that the UE #B transmits the SIP_INVITE message for the T-th time in S11, the "number of times of reception" within the entry corresponding to the phone number of the UE #B in the subscriber information table 16 is T.

In S20, the subscriber data management server 4 transmits a subscriber information acquisition response to the subscriber information acquisition request to the SIP proxy call control server 1. The subscriber information acquisition response includes the phone number and IP address of the UE #B.

In S21, the SIP proxy call control server 1 receives the subscriber information acquisition response from the subscriber data management server 4, generates an SIP_INFO message including the phone number and IP address of the UE #B as the subscriber information of the UE #B (in OP21 illustrated in FIG. 10), and transmits the generated SIP_INFO message to the receiving board 5 (in OP22 illustrated in FIG. 10). In S22, the receiving board 5 transmits, to the SIP proxy call control server 1, an SIP_200_RESPONSE message that is a response to the SIP_INFO message received from the SIP proxy call control server 1.

In S23, the SIP proxy call control server 1 determines that the "number of times of reception" within the entry corresponding to the phone number of the UE #B in the subscriber information table 16 is equal to or larger than T (Yes in OP33 illustrated in FIG. 11).

In S24, the SIP proxy call control server 1 transmits, to the subscriber data management server 4, a subscriber information change request that is a request to change a registration state of the subscriber information of the UE #B to an unregistered state (in OP34 illustrated in FIG. 11). In S25, the SIP proxy call control server 1 generates an SIP_4XX_RESPONSE message and transmits the generated SIP_4XX_RESPONSE message to the UE #B (in OP35 illustrated in FIG. 11).

In S26, the subscriber data management server 4 receives the subscriber information change request from the SIP proxy call connection server 1 and changes the "registration state" within the entry for the UE #B in the subscriber information table 16 from "registered" to "not registered". In addition, the subscriber data management server 4 changes the "forced deregistration flag" within the entry for the UE #B in the subscriber data table 41 to "ON". In S27, the subscriber data management server 4 transmits a subscriber information change response to the subscriber information change request to the SIP proxy call control server 1.

In S28, the SIP proxy call control server 1 receives the subscriber information change response from the subscriber data management server 4 and deletes the entry for the UE #B from the subscriber information table 16 (Yes in OP41 illustrated in FIG. 12 and in OP42 illustrated in FIG. 12).

Effects of Embodiment

Figure 14:
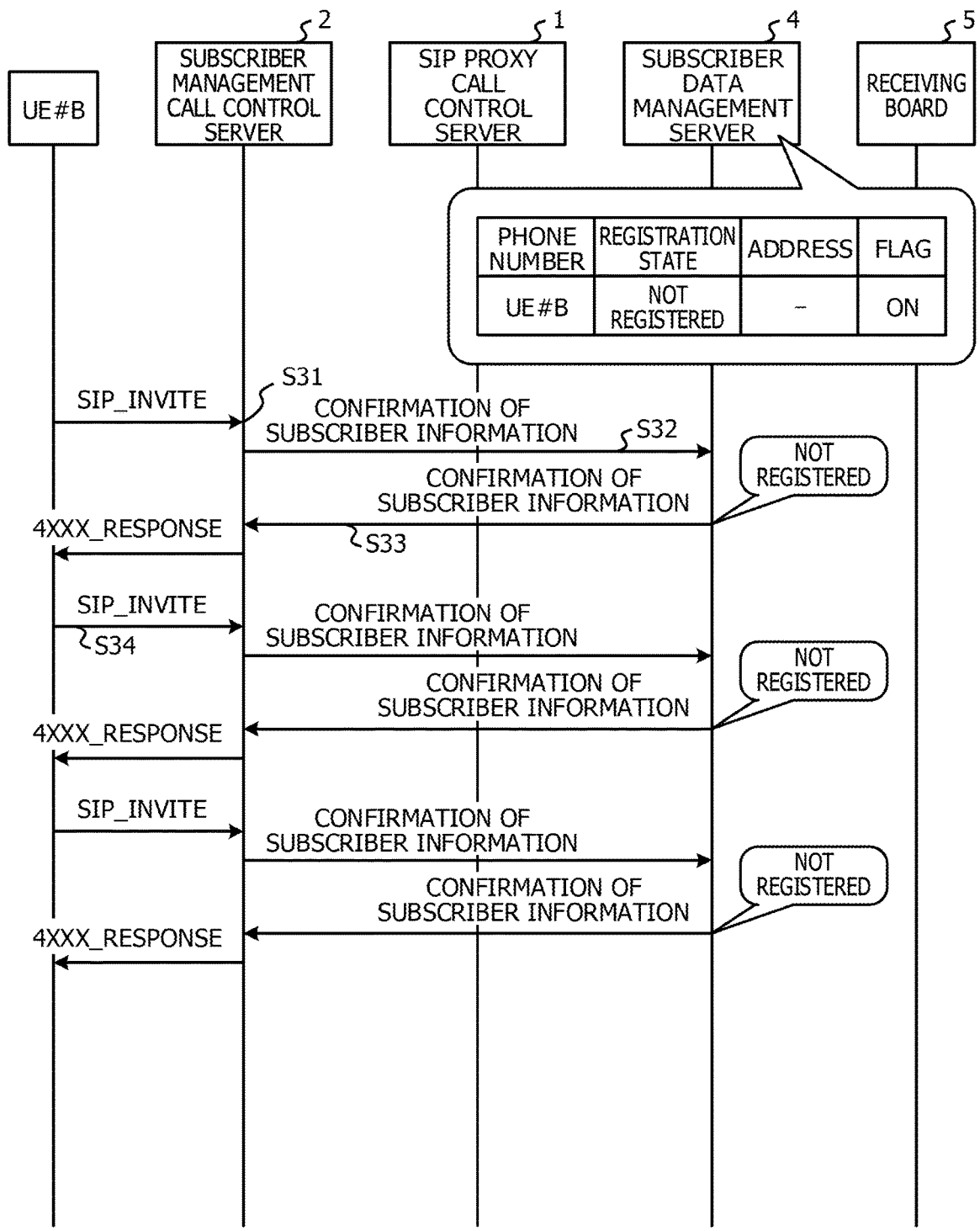
FIG. 14 is a diagram illustrating an example of a sequence of a process to be executed by the network system when an SIP_INVITE message that is an SIP vulnerability attack signal is received.

FIG. 14 is a diagram illustrating an example of a sequence of a process to be executed by the network system 100 when an SIP_INVITE message that is an SIP vulnerability attack signal is received from the UE #B after the process illustrated in FIG. 13B. In the example illustrated in FIG. 14, the "registration state" of the entry for the UE #B indicates "not registered" in the subscriber data table 41 of the subscriber data server 4.

In S31, the UE #B transmits the SIP_INVITE message that is the SIP vulnerability attack signal. In S32, the subscriber management call control server 2 receives the SIP_INVITE message transmitted by the UE #B and inquires of the subscriber data management server 4 so as to confirm whether or not the subscriber information of the UE #B is already registered in the subscriber data management server 4. In S33, the subscriber data management server 4 responds to the inquiry from the subscriber management call control server 2 or provides the response indicating that the subscriber information of the UE #B is not registered in the subscriber data management server 4, since the "registration state" of the entry corresponding to the phone number of the UE #B indicates "not registered" in the subscriber data table 41.

In S34, the subscriber management call control server 2 receives, from the subscriber data management server 4, the response indicating that the subscriber information of the UE #B is not registered in the subscriber data management server 4, and the subscriber management call control server 2 transmits an SIP_4XX_RESPONSE message to the UE #B. The UE #B disconnects a call when receiving the SIP_4XX_RESPONSE message.

After that, when the UE #B transmits an SIP_INVITE message, the processes of S31 to S34 are executed. Specifically, since the call is disconnected before the arrival of the SIP_INVITE message at the SIP proxy call control server 1, it is possible to suppress an increase in a load of the SIP proxy call control server 1 and suppress the occurrence of congestion.

The entry corresponding to the phone number of the UE #B is registered in the subscriber data management server 4, while the phone number of the UE #B is used as the key. Thus, even if the UE #B changes a CALL-ID in order to falsify an SIP_INVITE message and cause the SIP_INVITE message to be recognized as another call and transmits the SIP_INVITE message, a call established based on the SIP_INVITE message is disconnected by the subscriber management call control server 2.

Figure 15:
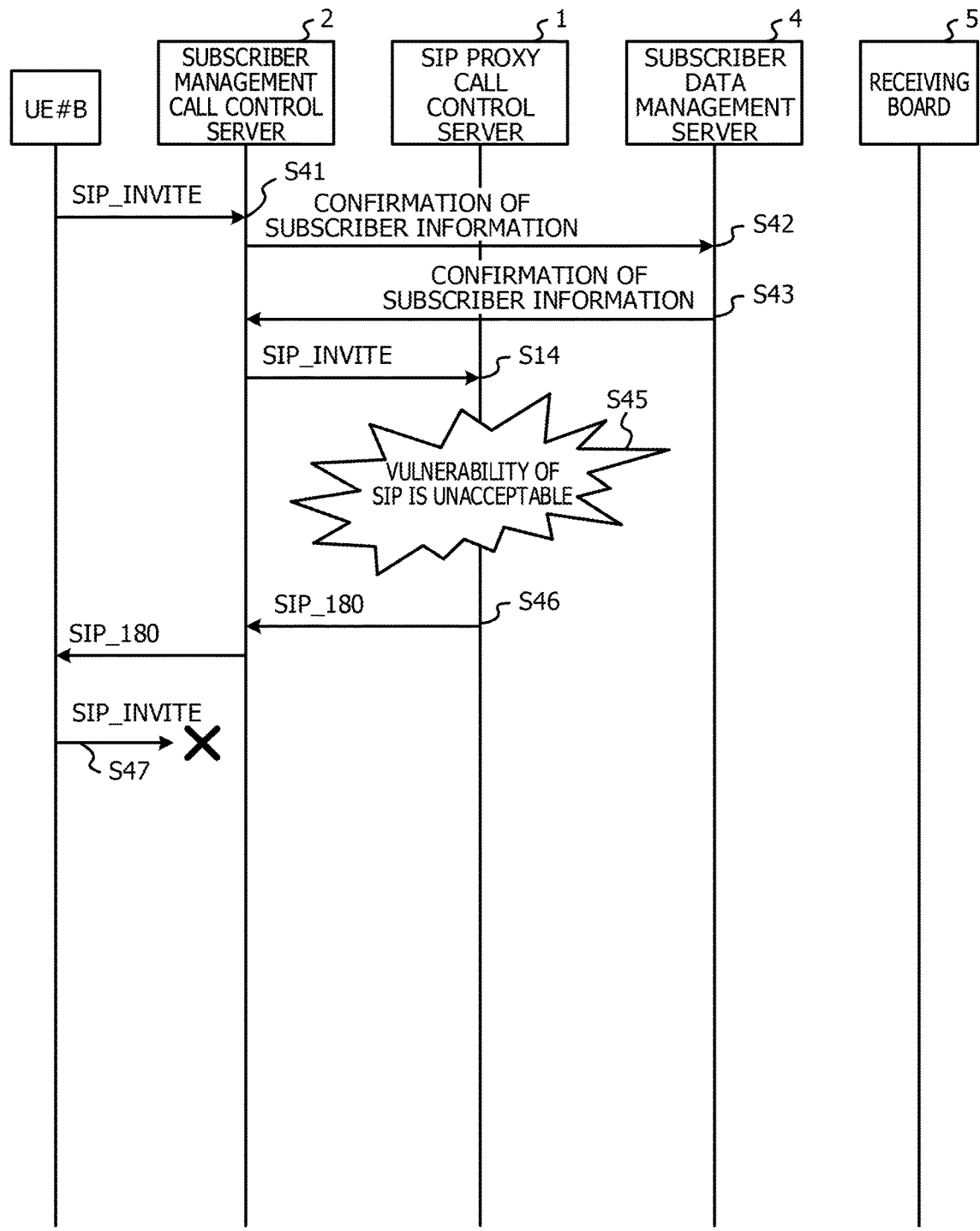
FIG. 15 is a diagram illustrating an example of the sequence of the process to be executed by the network system when the SIP_INVITE message that is the SIP vulnerability attack signal is transmitted.

FIG. 15 is a diagram illustrating an example of a sequence of a process to be executed by the network system 100 when an SIP_INVITE message that is an SIP vulnerability attack signal is transmitted.

S41 to S46 are the same as or similar to S11 to S16 illustrated in FIG. 13A. If the result of checking the vulnerability of the SIP_INVITE message indicates that the vulnerability is unacceptable, the SIP proxy call control server 1 transmits an SIP_180_RESPONSE message to the UE #B.

After that, if the "number of times of reception" within an entry corresponding to the phone number of the UE #B in the subscriber information table 16 is smaller than T, an SIP_4XX_RESPONSE message that is a response to the SIP_INVITE message transmitted in S41 is not transmitted. The UE #B continuously maintains the call established based on the SIP_INVITE message transmitted in S41 unless the UE #B spontaneously disconnects the call.

When receiving the SIP_180_RESPONSE message, the UE #B determines that the call is maintained. Thus, the UE #B does not transmit a call request using the CALL-ID until the call is disconnected. For example, in the case illustrated in FIG. 15, if the SIP_INVITE message includes a CALL-ID "1" and is transmitted in S41, the UE #B does not transmit an SIP_INVITE message using the CALL-ID "1" after the process of S46 unless the UE #B spontaneously disconnects the call. It is, therefore, possible to suppress the transmission of an SIP_INVITE message or an SIP vulnerability attack signal from the UE #B that makes an SIP vulnerability attack.

In the embodiment, the SIP proxy call control server 1 reports, to the receiving board 5, subscriber information of a device that is a source of an SIP_INVITE message whose result of checking vulnerability indicates that the vulnerability is unacceptable. Thus, the SIP proxy call control server 1 may share information of a vulnerability attacker with another system.

Others

Although the embodiment describes the SIP vulnerability attack made against the SIP network system, the technique described in the embodiment is applicable to a network system using a call control protocol other than the SIP.

In the embodiment, when receiving an SIP_INVITE message from a source device having the same phone number a number T of times or more within a time period of N seconds, the SIP proxy call control server 1 determines that the SIP proxy call control server 1 received an SIP vulnerability attack from the source device. The requirement for determining that the SIP vulnerability attack is received is not limited to this. For example, the requirement may be a requirement for determining that the SIP vulnerability attack is received if the SIP proxy call control server 1 receives an SIP_INVITE message in a predetermined format.

In the embodiment, if the result of checking vulnerability of an SIP_INVITE message indicates that the vulnerability is unacceptable, the SIP proxy call control server 1 transmits an SIP_180_RESPONSE message to a source device that transmitted the SIP_INVITE message. The message that is transmitted to the source device if the result of checking the vulnerability of the SIP_INVITE message indicates that the vulnerability is unacceptable is not limited to the SIP_180_RESPONSE message. As long as the message enables a call to be continuously maintained, a RESPONSE message that is in the 100s or 200s may be used.

In the embodiment, the SIP proxy call control server 1 uses phone numbers to identify UE 3. The method of identifying the UE 3, however, is not limited to this. For example, if a call request signal includes identification information specific to UE 3, the SIP proxy call control server 1 may use the specific identification information to identify the UE 3.

Recording Medium

A program that enables a computer, another machine, or another device (hereinafter referred to as computer or the like) to achieve at least any of the aforementioned functions may be stored in a computer-readable recording medium from which the program is read by the computer or the like. The at least any of the functions may be provided by causing the program stored in the recording medium to be read into the computer or the like and executed by the computer or the like.

The computer-readable recording medium is a non-temporary recording medium that electrically, magnetically, optically, mechanically, or chemically accumulates information such as data and programs and from which the data and the programs are read by the computer or the like. Examples of the recording medium that are detachable from the computer or the like are a flexible disk, a magneto-optical disc, a CD-ROM, a CD-R/W, a DVD, a Blu-ray disc, a DAT, a 8 mm tape, and a memory card such as a flash memory. Examples of the recording medium that are fixed in the computer or the like are a hard disk and a read only memory (ROM). As an example of the recording medium that is detachable from the computer or the like and may be fixed in the computer or the like, a solid state drive (SSD) may be used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A call control device comprising:
a memory; and
a processor coupled to the memory and configured to:
receive a call request from a communication device, a source of the call request being a terminal, the call request being transferred by the communication device when the terminal is registered in a management device, and
request the management device to deregister the terminal when the call control device has determined that the call control device is attacked from the terminal based on the call request, wherein
the processor is configured to determine that the call control device is attacked from the terminal when the number of call requests from the terminal within a predetermined period is equal to or larger than a predetermined number.

2. The call control device according to claim 1, wherein the processor is configured to:
determine whether the call request is invalid, and
transmit a first signal to the terminal when the call request is invalid, the first signal indicating that a call processing requested by the call request continues.

3. The call control device according to claim 1, wherein the processor is configured, after transmitting the first signal, to transmit a second signal to the terminal when the terminal has been deregistered in the management device, the second signal indicating that the call request is rejected.

4. The call control device according to claim 1, wherein the processor is configured to transmit a third signal to the predetermined destination when the call request is invalid.

5. The call control device according to claim 4, wherein the processor is configured to request an address of the terminal from the management device when the call request is invalid, and
the third signal notifies the address of the terminal.

6. The call control device according to claim 1, wherein the call control device is a Session Initiation Protocol (SIP) proxy server,
the management device is a SIP location server, and
the call request is a SIP_INVITE message.

7. A call control method comprising:
receiving a call request from a communication device, a source of the call request being a terminal, the call request being transferred by the communication device when the terminal is registered in a management device; and
requesting the management device to deregister the terminal when a call control device has determined that the call control device is attacked from the terminal based on the call request, wherein
the call control device is configured to determine that the call control device is attacked from the terminal when the number of call requests from the terminal within a predetermined period is equal to or lamer than a predetermined number.

8. A call control system comprising:
a management device;
a terminal; and
a call control device configured to:
receive a call request from a communication device, a source of the call request being the terminal, the call request being transferred by the communication device when the terminal is registered in the management device, and
request the management device to deregister the terminal when the call control device is determined that the call control device is attacked from the terminal based on the call request, wherein the call control device is configured to determine that the call control device is attacked from the terminal when the number of call requests from the terminal within a predetermined period is equal to or larger than a predetermined number.

* * * * *